(12) United States Patent  
Ahn et al.

(10) Patent No.: US 9,059,844 B2
(45) Date of Patent: Jun. 16, 2015

(54) ETHERNET APPARATUS AND METHOD FOR SELECTIVELY OPERATING MULTIPLE LANES

(75) Inventors: Kye-Hyun Ahn, Daejeon-si (KR); Choong-Reol Yang, Daejeon-si (KR); Seung-Hwan Kim, Daejeon-si (KR); Kyeong-Eun Han, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 828 days.

(21) Appl. No.: 13/325,227

(22) Filed: Dec. 14, 2011

(65) Prior Publication Data

US 2012/0155486 A1  Jun. 21, 2012

(30) Foreign Application Priority Data

Dec. 15, 2010 (KR) .......................... 10-2010-0128364

(51) Int. Cl.
  *H04J 3/17*  (2006.01)
  *H04L 5/14*  (2006.01)
(52) U.S. Cl.
  CPC .................................. *H04L 5/1423* (2013.01)
(58) Field of Classification Search
  USPC .................................. 370/433, 509, 464, 465
  See application file for complete search history.

(56) References Cited

U.S. PATENT DOCUMENTS

| 8,385,374 B1* | 2/2013 | Wohlgemuth ................. 370/509 |
| 2005/0262284 A1* | 11/2005 | Cherukuri et al. ............ 710/307 |
| 2009/0154492 A1 | 6/2009 | Diab et al. |
| 2010/0162033 A1* | 6/2010 | Ahn et al. ......................... 714/4 |

FOREIGN PATENT DOCUMENTS

KR  10-2009-0065473  6/2009

* cited by examiner

*Primary Examiner* — Thai Nguyen
(74) *Attorney, Agent, or Firm* — H.C. Park & Associates, PLC (57) ABSTRACT

A high-speed Ethernet apparatus having a multiple lane configuration and method for selectively operating the multiple lanes to allow lanes to participate or not in data transmission and reception. The Ethernet apparatus includes: a transfer rate control unit to set a state of each of multiple physical coding sub-layer (PCS) lanes inside to be the same as a state of corresponding each of multiple physical transmission lanes based on state change information that indicates whether the each physical transmission lane is activated or not, and to remove idle blocks from data blocks which are received at a transfer rate of a physical transmission lane in active state among the multiple physical transmission lanes; and a block allocating unit to allocate the data blocks from which the idle blocks have been removed through PCS lanes in active state that correspond to the physical transmission lanes in active state.

17 Claims, 7 Drawing Sheets

ETHERNET APPARATUS AND METHOD FOR SELECTIVELY OPERATING MULTIPLE LANES

CROSS-REFERENCE TO RELATED APPLICATION(S)

This application claims the benefit under 35 U.S.C. §119 (a) of Korean Patent Application No. 10-2010-0128364, filed on Dec. 15, 2010, in the Korean Intellectual Property Office, the entire disclosure of which is incorporated herein by reference for all purposes.

BACKGROUND

1. Field

The following description relates to a technology for controlling a transfer rate of an Ethernet apparatus, and more particularly, to an Ethernet apparatus having a multiple lane configuration and a method of selectively operating the multiple lanes of the Ethernet apparatus.

2. Description of the Related Art

IEEE 802.3 for a high-speed broadband transmission system supports multiple-lane configuration, as IEEE 802.3 Ethernet standards that support a 40 Gigabit transfer rate and a 100 Gigabit transfer rate. Multiple-lane configuration is a configuration in which multiple lanes having a relatively low transfer rate are used in parallel to one another to form a transmission link with a high-speed transfer rate.

According to IEEE 802.3 standards, a 100 Gb/s Ethernet apparatus is capable of processing data, which is transmitted from media access control layer to a physical layer at a transfer rate of 100 Gb/s, in a distributed manner using ten electrical lanes with a transfer rate of 10 Gb/s or four electrical lanes with a transfer rate of 25 Gb/s. In addition, for a 40 Gigabit Ethernet apparatus, four electrical lanes are assigned between physical coding sub-layer (PCS) and a physical medium attachment (PMA) layer. Such electrical lanes transmit data to corresponding each of multiple optical lanes via PMA layer.

In addition, IEEE802.3 specifies twenty virtual lanes inside PCS layer in an effort to smoothly support the bonding between electrical lanes and optical lanes even if the number of the electrical lanes and the optical lanes are not the same, and specifies a multi-lane distribution (MLD) function block that distributes or bonds 64B/66B coded blocks to the virtual lanes.

Such multiple lanes are adapted for use in transmitting large-capacity data at high speed. There is, however, a case in which temporarily not all bandwidths are required for some particular purposes, for example, for error control, reduction in power consumption or management of array components. For example, if only one of multiple lanes has an error in 100 Gb/s Ethernet system, there is a need of using the rest of the multiple lanes other than the lane having an error. As another example, traffic to be processed by 100 Gb/s Ethernet system is within a rate of several tens of Gb/s, it may need to operate the system to use only some lanes selectively.

In addition, as the data transfer rate increases, power consumption of a communication apparatus rises dramatically. Thus, there is a need for a technology that reduces power consumption in data communication through high-speed Ethernet interface.

IEEE 802.3az Entergy Efficient Ethernet (EEE) standardizes Low Power Idle (LPI) scheme. LPI scheme transmits any data at the maximum transfer rate supported by a transmission link when there is data to be transmitted, and sets the transmission link to idle state (zero transfer rate) when there is no data to be transmitted. In LPI scheme, it is possible to reduce power consumption by inactivating parts of circuits required for data transmission and reception when there is no data to be transmitted.

LPI may be efficient to reduce the energy consumption in transmission of traffic with strong burst properties, but cannot reduce the energy consumption in transmitting streaming traffic which requires continuous transmission service at a low data rate. Furthermore, the technical scope of IEEE 802.3az is to support a transfer rate lower than 10 Gigabit and not to take into consideration a configuration in which a single transmission link, as an Ethernet interface in accordance with Copper physical layer standard, consists of multiple lanes of a low rate.

SUMMARY

The following description relates to a high-speed Ethernet apparatus and method for selectively operating multiple lanes to allow one or more lanes to participate or not in data transmission and reception.

In one general aspect, there is provided an Ethernet apparatus including: a transfer rate control unit configured to set a state of each of multiple physical coding sub-layer (PCS) lanes inside to be the same as a state of corresponding each of multiple physical transmission lanes based on state change information that indicates whether the each physical transmission lane is activated or not, and to remove idle blocks from data blocks which are received at a transfer rate of a physical transmission lane in active state among the multiple physical transmission lanes; and a block allocating unit configured to allocate the data blocks from which the idle blocks have been removed through PCS lanes in active state that correspond to the physical transmission lanes in active state.

In another general aspect, there is provided An Ethernet apparatus including: a data transmitting unit configured to process data transmitted from an upper layer by selectively using multiple physical coding sub-layer (PCS) lanes inside so as to use some of multiple physical transmission lanes; and a data receiving unit configured to process data transmitted through the some physical transmission lanes, wherein the data transmitting unit is configured to comprise a transfer rate control unit configured to set a state of each of the multiple PCS lanes inside the Ethernet apparatus to a state of corresponding each of the multiple physical transmission lanes based state change information that indicates the each physical transmission lane is activated or not, and to remove idle blocks from data blocks which are received at a transfer rate of a physical transmission lane in active state among the multiple physical transmission lanes and a block allocating unit configured to transmit the data blocks from which the idle blocks have been removed through PCS lanes in active state.

In another general aspect, there is provided a method of selectively operating multiple lanes of an Ethernet apparatus, including: setting a state of each of multiple physical coding sublayer (PCS) lanes inside the Ethernet apparatus to be the same as a state of corresponding each of multiple physical transmission lanes based on state change information that indicates whether the each physical transmission lane is activated or not; removing idle blocks from data blocks which are received at a transfer rate of a physical transmission lane in active state among the multiple physical transmission lanes; and transmitting the data blocks from which the idle blocks have been removed through PCS lanes in active state that correspond to the physical transmission lanes in active state.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
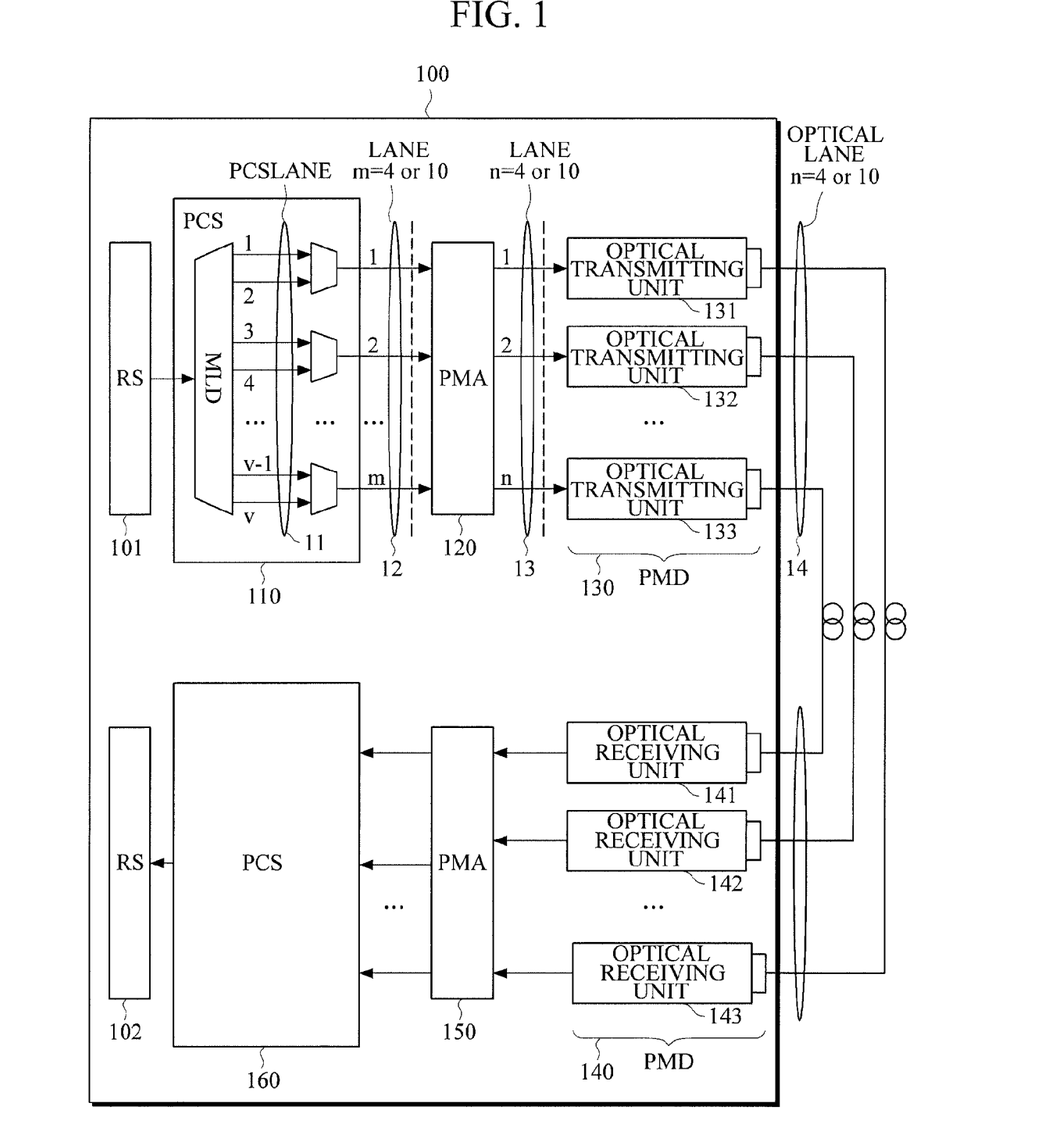
FIG. 1 is a diagram illustrating an example of an Ethernet apparatus having a multiple-lane configuration.

FIG. 1 illustrates an example of an Ethernet apparatus having a multiple-lane configuration.

The Ethernet apparatus 100 may distinguish channels transmission active state or transmission inactive state in a physical layer or a lane for selectively operating multiple lanes, and may transmit data through a transmission lane in active state. In particular, the Ethernet apparatus 100 may be configured to transmit an Ethernet frame in consideration of a transfer rate reduced due to a physical transmission lane in transmission inactive state.

Referring to FIG. 1, the Ethernet apparatus 100 may include reconciliation sub-layer (RS) executing units 101 and 102, physical coding sub-layer (PCS) executing units 110 and 160, physical medium attachment (PMA) sub-layer executing units 120 and 150, and physical medium dependent (PMD) sub-layer executing units 130 and 140. The RS executing unit 101, is the PCS executing unit 110, the PMA executing unit 120 and the PMD executing unit 130 are installed on a data transmission path, and the RS executing unit 102, the PCS executing unit 160, the PMA executing unit 150 and the PMD executing unit 140 are installed on a data receiving path.

Above the RS executing units 101 and 102, upper layers including a media access control (MAC) layer are present, and below the PMD executing units 130 and 140, physical transmission lanes such as an optical lane are present.

The RS executing unit 101 and 102 may convert signals to enable the MAC layer to execute communication regardless of the type of a physical layer. For example, the RS executing unit 101 may convert data from the MAC layer into a format that can be transmitted according to a type of a transmission link. Moreover, the RS executing unit 102 may convert data received from a lower layer into PLS primitive so that the MAC layer can recognize.

The PCS executing unit 110 may generate a data block (or a code block) for data transmission, and the PCS executing unit 160 may decode the data block received from the PMA executing unit 150. For example, the PCS executing unit 110 may generate a data block according to 64B/66B coding scheme.

The PMA executing unit 120 may transmit the data block received from the PCS executing unit 110 to a physical transmission lane (or a physical medium), and the PMA executing unit 150 may forward the data frame received from the physical transmission lane to the PCS executing unit 160.

The Ethernet apparatus 100 may include a variety of types of lanes. A high-speed transmission frames forwarded from an upper layer may be distributed to the multiple PCS lanes 11 by the PCS executing unit 110. The PCS lanes 11 are conceptual virtual lanes. The number (v) of PCS lanes 11 may be set to the least common multiple of the number (m) of is electrical lanes and the number (n) of optical lanes, which are implemented in a physical layer. The data blocks allocated to the PCS lanes 11 may be forwarded to the PMA executing unit 120 in parallel through the m electrical lanes 12.

The PMA executing unit 120 may receive m electrical lanes 12 as inputs and output n electrical lane 13. Here, m and n may be the same or may differ from each other. For example, according to IEEE802.3ba, m and n may be set to 4 or 10.

The output of the PMA executing unit 120 may be forwarded to the PMD executing unit 130 that transmits signals through an Ethernet transmission link. The PMD executing unit 130 may include optical transmission units 131, 132, and 133 that transmit n optical signals.

As another example, instead of an optical transmission link, any other transmission medium may be used. If the transmission link is implemented as a different transmission medium, the PMD executing unit 120 may be implemented as a different form of module, and parallel channels in the transmission medium may be considered the same as the optical lanes 14. Bit streams to be transmitted are input to the optical transmission units 131, 132, and 133 through the n optical electrical lanes 13 and converted into optical signals which are transmitted through the n optical lanes 14. Hereinafter, physical transmission lanes as the optical lanes 14 of the Ethernet apparatus 100 will be described.

The PCS lanes 11, the electrical lanes 12 and 13, and the optical lanes 14 may be in such a relation that they correspond to one another according to the design of the Ethernet apparatus 100, and a path between lanes through which data blocks are transmitted is fixed. For example, a data block allocated to an arbitrary x-th lane is always forwarded through a y-th lane among the optical lanes 14. In this case, for the selective operation of a lane by which a data block is received and transmitted through an activated optical lane among the multiple optical lanes 14, is idle blocks that correspond to transfer rate which is reduced due to the optical lanes in inactive state are required to be deleted.

In addition, to control transfer rate by adjusting a state of the optical lanes 14, states of the PCS lanes 11 that correspond to the optical lanes 14 may also be required to be changed. This is because valid data that must be transmitted should be provided to the PCS lane corresponding to the activated optical lane so as to be transmitted through an activated physical transmission lane. To this end, a relationship between the PCS lanes 11 as virtual lanes inside the Ethernet apparatus 100 and the optical lanes 14 as physical transmission lanes may need to be defined.

Figure 2:
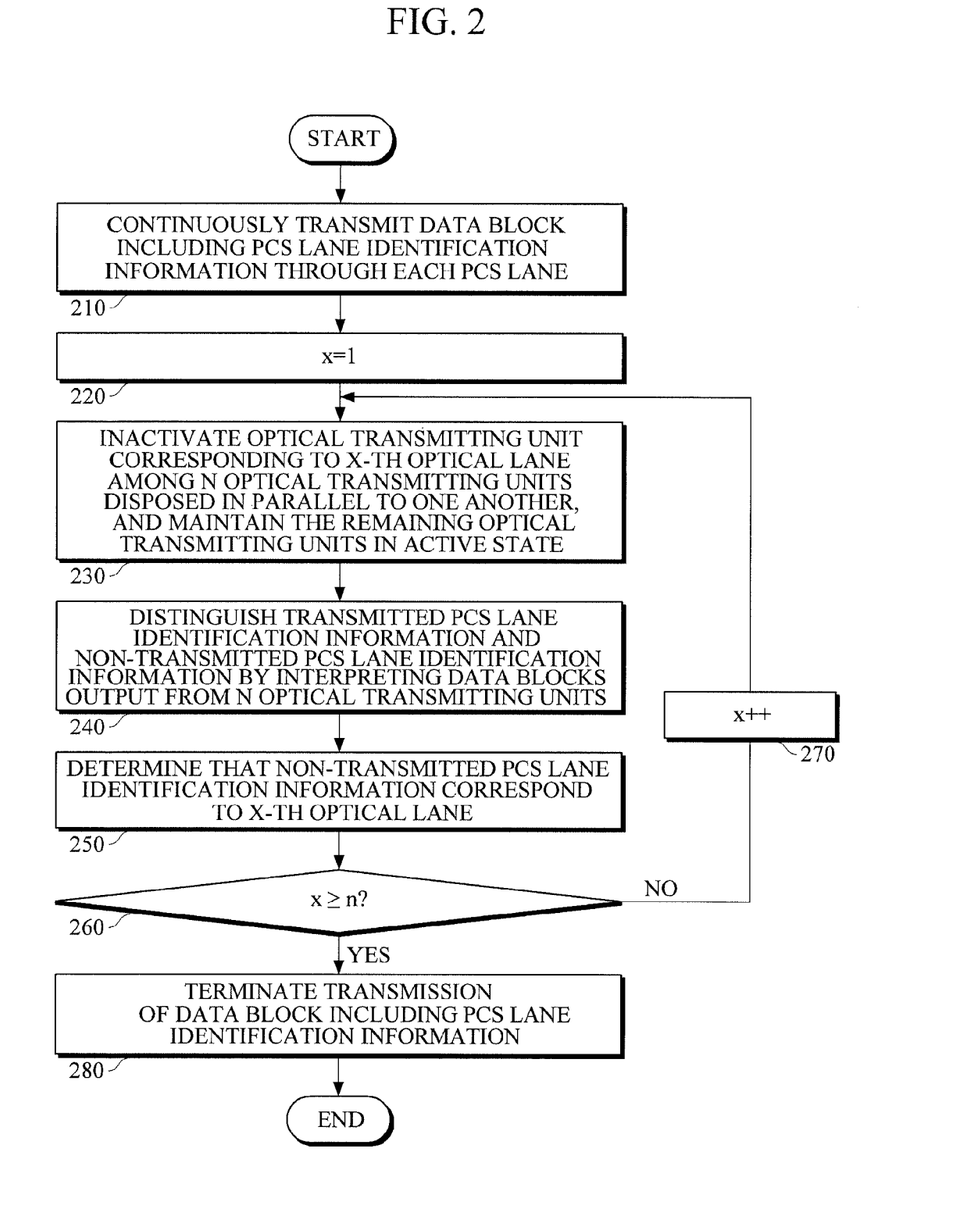
FIG. 2 is a flowchart depicting an example of an algorithm for defining a relationship between PCS lanes and optical lanes.

FIG. 2 illustrates a flowchart of an example of an algorithm for defining a relationship between PCS lanes and optical lanes.

Referring to FIGS. 1 and 2, the PCS executing unit 110 may generate a particular data block through each PCS lane, and transmit the data block continuously while the algorithm shown in FIG. 2 is being executed (210). At this time, the generated data block includes PCS lane identifier information to identify a PCS lane to which the data block is transmitted. The PCS lane identifier information may include a PCS lane number or any other types of identifier.

To determine a relationship between the optical lanes and the PCS lanes, states of the respective optical transmitting unit 131, 132, and 133 implemented as the optical lanes are set stepwise. The details of process are as blow.

For sequential inspection, a variable x indicating an optical number of an optical lane to be inspected among the multiple optical lanes is set to 1 (220).

A state of an optical transmission unit (e.g., the optical transmission unit 131) corresponding to the x-th optical lane is set inactive, and the remaining optical transmission units (e.g., 132 and 133) are maintained in active state (230).

In this state, the data blocks output from the optical transmission units 131, 132, and 133 are interpreted to distinguish between PCS lane identifier information which are successfully transmitted and those which are not (240).

The PCS lanes corresponding to the non-transmitted PCS lane identifier information may be determined to correspond to the x-th optical lane in inactive state (250).

While x is increased by 1 (270), the operations 230, 240, and 250 to define a relationship between a PCS lane and an optical lane are repeated until the defining of a relationship is made on all optical lanes. In the example shown in FIG. 2, n optical transmitting units 131, 132, and 133 are arranged in parallel, and each optical transmitting unit 131, 132, and 133 performs transmission corresponding to one optical lane, and thus the operations 230, 240, and 250 may be performed n times. Once the inspection on all optical lanes is completed (260), the continuous transmission of a data block performed in operation 210 is terminated (280). As such, a relationship between the optical lanes 14 as the physical transmission lanes and the PCS lanes 11 as the virtual lanes inside the Ethernet apparatus may be defined.

Figure 3:
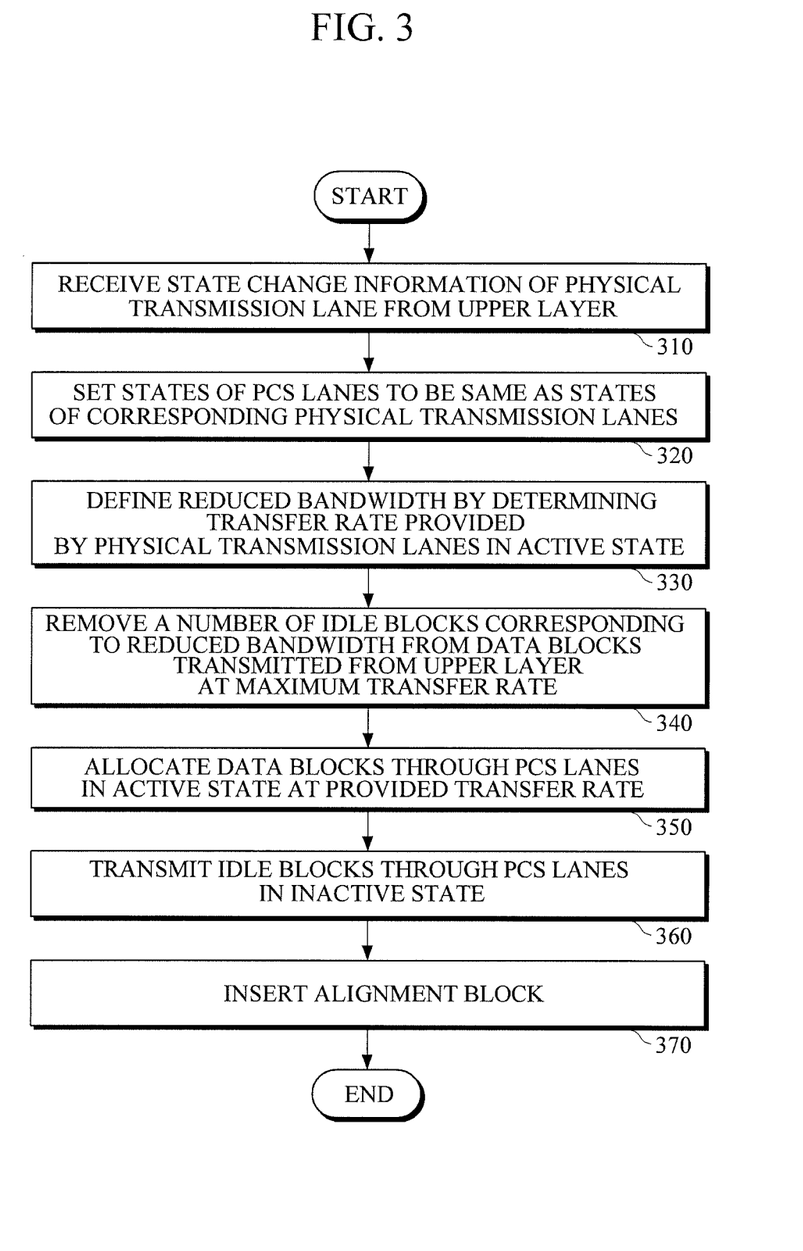
FIG. 3 is a flowchart depicting an example of selectively operating one or more lanes of multiples lanes of an Ethernet apparatus to determine the lanes' participation in data transmission.

FIG. 3 illustrates a flowchart of an example of selectively operating one or more lanes of multiples lanes of an Ethernet apparatus to determine the lanes' participation in data transmission.

State change information that indicates whether each of physical transmission lanes is activated is received from an upper layer (310). The upper layer may be an RS layer, or above.

In response to the state change information, each of PCS lanes is set to be the same as the corresponding physical transmission lane (320). When the PCS lanes corresponding to the respective physical transmission lanes are determined according to the algorithm shown in the example in FIG. 2, states of the respective PCS lanes are set to be the same as those of the corresponding physical transmission lanes.

A transfer rate provided by the physical transmission lanes in active state is determined, and a reduced bandwidth is defined corresponding to a difference between the maximum transfer rate and the determined transfer rate (330). The transfer rate provided by each of the physical transmission lanes may be defined as a product of the number of the physical transmission lanes in active state and the bandwidth provided by each physical transmission lane. For example, when each physical transmission lane is 10 Gbps and three physical transmission lanes are in active state, a transfer rate may be set to 30 Gbps. Hence, when the maximum transfer rate is 40 Gbps, a reduced bandwidth is 10 Gpbs.

Among the data blocks transmitted from an upper layer at the maximum transfer rate, idle blocks including meaningless data are selectively removed to be matched to the reduced transfer rate provided by a current transmission link, that is, the physical transmission lane in active state (340). The idle blocks are blocks that do not contain valid data, and may be determined by a value of a type field of a 66-bit encoded PCS block. For example, if an 8-bit type field value is 0x00 according to IEEE 802.3 standards, the relevant block may be an idle block, and if the type field value is not 0x00, the block may be determined as a data block including valid data.

The data blocks adjusted according to the transfer rate provided by the physical transmission lanes in active state are evenly distributed through the PCS lanes which have been set to active state in operation 320 (350).

While the data blocks are evenly distributed to the PCS lanes in active state (350), the PCS lanes in inactive state are not distributed the data blocks including valid data. Instead, a block including idle data is generated and transmitted to the PCS lanes in inactive state (360). This is performed in order to avoid the influence on the operation of a PMA sub-layer.

After the operation 360, an alignment block is periodically inserted into each PCS lane (370). The alignment block may have the same size as a data block, and may include data value is arranged for skew and order correction between lanes in a reception side.

If, as described above, a transfer rate is matched to a reduced transfer rate provided by a transmission link by selectively removing idle blocks including meaningless data among the data blocks transmitted from an upper layer at the maximum transfer rate in order to avoid the influence on transmission of valid data, a transmission module (for example, among the optical transmitting units 131, 132, and 133 in FIG. 1, an optical transmitting unit connected to a physical transmission lane in inactive state) connected to the physical transmission lane in inactive state may be operated at low power. In the same manner, a reception module (for example, among the optical receiving units 141, 142, and 143 in FIG. 1, an optical receiving unit connected to the physical transmission lane in inactive state) connected to the physical transmission lane in inactive state that corresponds to the PCS lane that has been set to inactive state may be operated at low power. Therefore, the optical transmitting unit and the optical receiving unit which are connected to the physical transmission lane in inactive state are operated at low power, thereby reducing power consumption of the Ethernet apparatus 100.

For example, in the case of the Ethernet apparatus 100 connected to an Ethernet link of 40 G, even when an average link usage rate ranges from 5% to 10%, transmission/reception modules included in the Ethernet apparatus 100 may operate simultaneously at the maximum transfer rate of 40 G at all times. For example, in Ethernet of 40 G/100 G in which 10 G lanes are used in parallel, when only three transmission lanes among four 10 G transmission lanes are activated and operated at 30 G, power consumption may be reduced by the amount of one transmission module.

Hereinafter, two configurations of an Ethernet apparatus that executes a selective lane operating algorithm as shown in the example in FIG. 3 are described.

Figure 4:
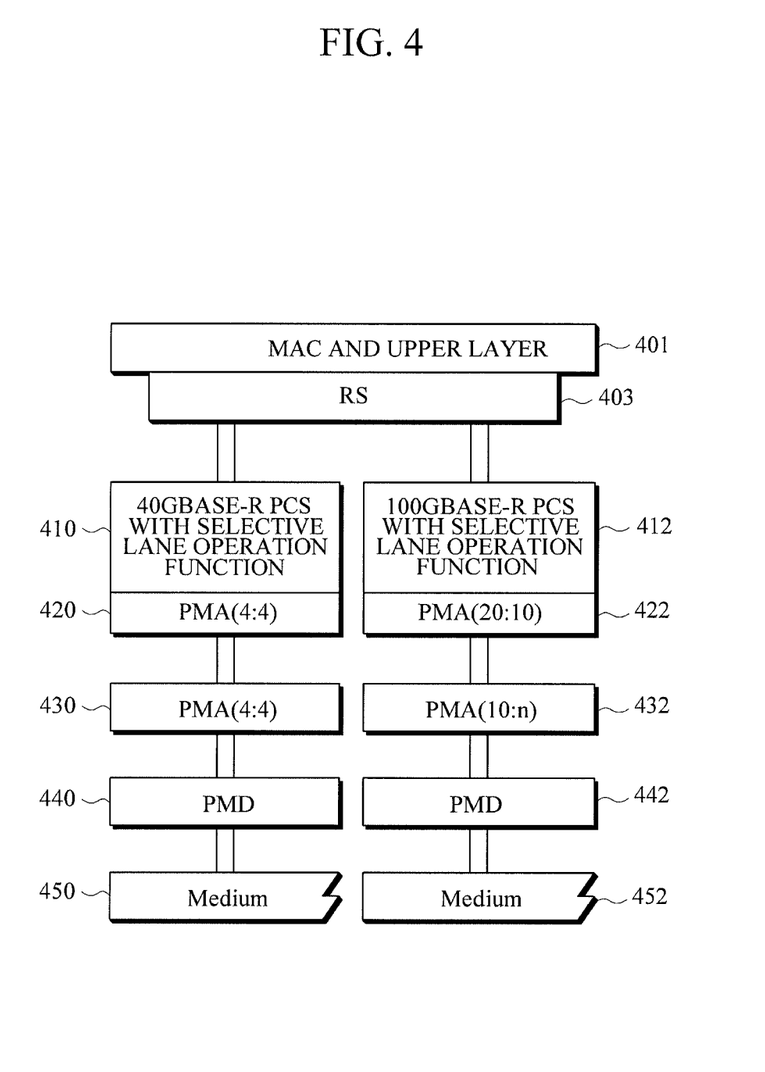
FIG. 4 is a diagram illustrating an example of a layer configuration of an Ethernet apparatus when a physical coding sub-layer (PCS) performs selective lane operation.

FIG. 4 illustrates an example of a layer configuration of an Ethernet apparatus when a is PCS performs selective lane operation.

In FIG. 4, a MAC and upper layer 401 and an RS 403 may be used in common for a PHY layer configuration of 40-giga-bit Ethernet and a physical layer configuration of 100-giga-bit Ethernet. According to the maximum transfer rate, the physical layer configuration of 40-giga-bit Ethernet consists of a PCS 410 that is capable of selectively operating a lane, PMAs 420 and 430, a PMD 440, and a transmission medium 450. The physical layer configuration of 100-giga bit Ethernet consists of a PCS 412 that is capable of selectively operating a lane, PMAs 422 and 432, a PMD 422, and a transmission medium 452.

Figure 5:
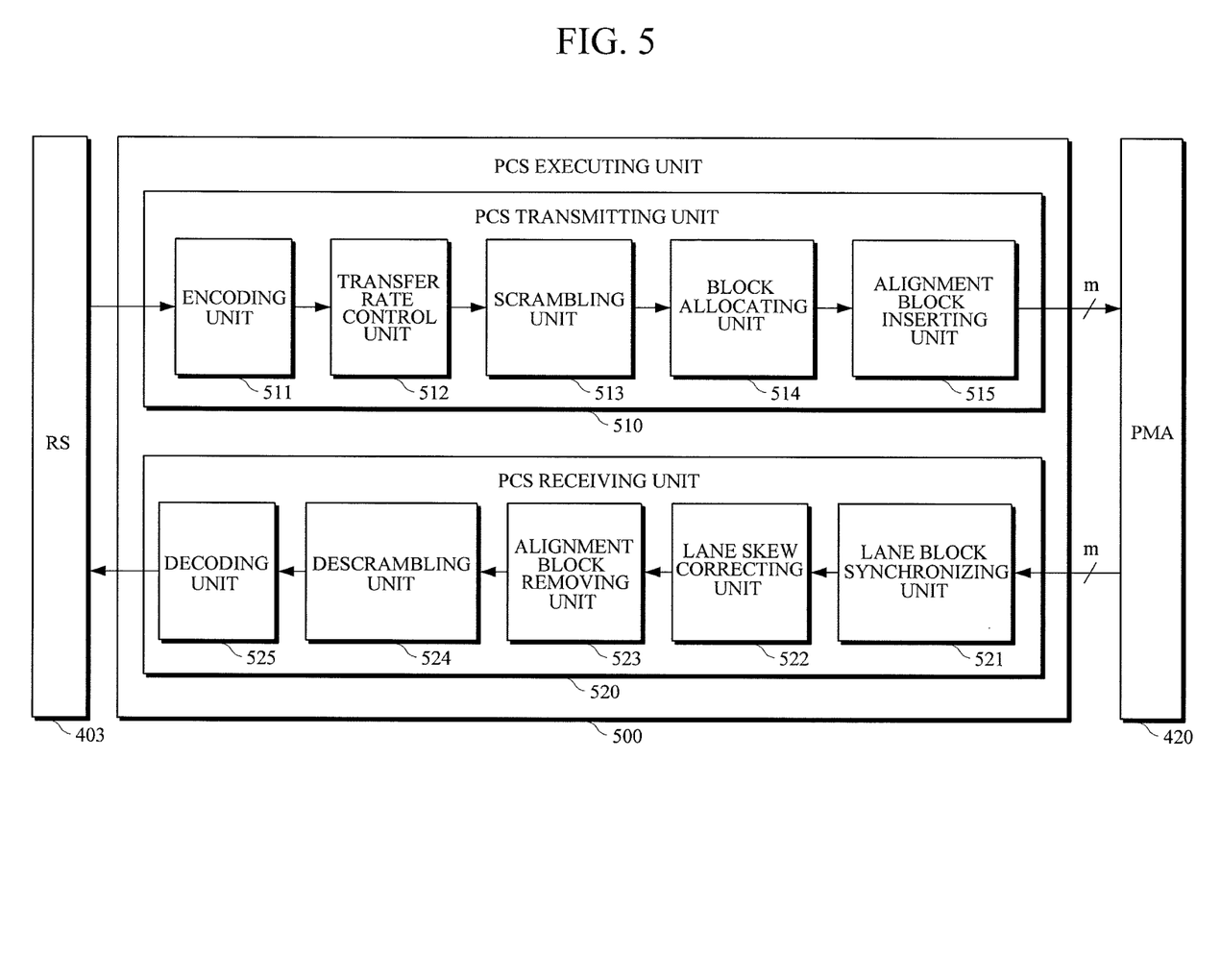
FIG. 5 is a diagram illustrating an example of a configuration of an Ethernet apparatus when the PCS shown in FIG. 4 selectively operates a lane.

FIG. 5 illustrates an example of a configuration of an Ethernet apparatus when the PCS shown in FIG. 4 selectively operates a lane.

Referring to FIG. 5, the PCS 410 may be implemented as a PCS executing unit 500. The PCS executing unit 500 may include a PCS transmitting unit 510 and a PCS receiving unit 520.

The data processing flow in transmission side is described below.

The PCS transmitting unit 510 may selectively use inner PCS lanes to process data transmitted from an upper layer in an effort to selectively use some physical transmission lanes among multiple physical transmission lanes. The PCS transmitting unit 510 may include an encoding unit 511, a transfer rate control unit 512, a scrambling unit 513, a block allocating unit 514, and an alignment block inserting unit 515.

Frames from the MAC and upper layer 401 and the RS 403 may be forwarded to the PCS transmitting unit 510 at the maximum transfer rate according to media independent interface standards such as 40 gigabit media independent interface (XLGMII) or 100 gigabit media independent interface (CGMII). The forwarded frames may be encoded to be generated into a data block by the encoding unit 511. For example, the encoding unit 511 may generate 66 data blocks from a forwarded 64-bit data. The data blocks may be classified into data blocks including valid data and idle block including no valid data.

The transfer rate control unit 512 may receive state change information from the upper layer, which indicates activation or deactivation of a physical transmission lane. According to the state change information, the transfer rate control unit 512 may set a state of each PCS land to be the same as the state of a corresponding physical transmission lane. In addition, the transfer rate control unit 512 may specify a transfer rate provided by the physical transmission lanes in active state to determine a bandwidth reduced from the maximum transfer rate. The transfer rate control unit 512 may selectively remove idle blocks that include meaningless data from the data blocks forwarded from the upper layer at the maximum transfer rate, thereby adjusting a current transfer rate to the reduced transfer rate provided by a transmission link.

For example, if a 40 gigabit Ethernet apparatus consisting of four 10 gigabit physical transmission lanes may operate one physical transmission lane in inactive state, the transfer rate control unit 512 may adjust a data transfer rate of 40 gigabit per second to 30 gigabit per second. To this end, the transfer rate control unit 512 may distinguish idle blocks that do not include any valid data from data blocks to be transmitted, and remove the idle blocks by the bandwidth reduced due to the physical transmission lanes in inactive state. In another example, the transfer rate control unit 512 may be configured to be placed ahead of the encoding unit 511 to to adjust a transfer rate prior to encoding data to be transmitted.

The scrambling unit 513 may scramble transmission data blocks which are based on a valid transfer rate.

The block allocating unit 514 may allocate the data blocks that have undergone through encoding and scrambling to a number of PCS lanes. The block allocating unit 512 may allocate is the data blocks only to the PCS lanes corresponding to transmission lanes in active state at a fair rate, except the PCS lanes corresponding to transmission lanes in inactive state. Moreover, the block allocating unit 514 may not allocate the transmission data blocks to the PCS lanes in inactive state but instead may insert idle data blocks that have the same size as the transmission data blocks and have meaningless values into the PCS lanes in inactive state. This is to prevent the influence on the PMA sub-layer 420 that performs multiplexing and demultiplexing.

The alignment block inserting unit 515 may additionally insert an alignment block into each PCS lane periodically. An output from the alignment block inserting unit 515 may be transmitted to the PMA sub-layer 420.

The data processing flow in reception side is described below.

The PCS receiving unit 520 may perform functions defined by IEEE 802.3 PCS sequentially on data blocks transmitted from the PMA sub-layer 420 through m lanes. To this end, the PCS receiving unit 520 may include a lane block synchronizing unit 521, a lane skew correcting unit 522, an alignment block removing unit 523, a descrambling unit 524, and a decoding unit 525.

The lane block synchronizing unit 521 may generate a data block from received bit streams in synchronization with one another. The lane skew correcting unit 522 may perform skew correction without expecting the alignment blocks to be received through the PCS lanes in inactive state that correspond to the physical transmission lanes in inactive state. The descrambling unit 523 may descramble the received data blocks and distinguish a type of data included in each data block. The decoding unit 525 may decode the data blocks and transmit the decoded data blocks to the RS layer 403.

To selectively operate lanes according to the embodiments, the lane skew correcting unit 522 and the alignment block removing unit 523 may be able to process the lanes in recognition of a fact that the alignment blocks are not transmitted through the PCS lanes in inactive state. To this end, the state change information that indicates the activation of the physical transmission lane is forwarded from the RS layer 403 or a layer above the RS layer 403 to the lane skew correcting unit 522 and the alignment block removing unit 523. The remaining processes other than the forwarding process are the same as the receiving process of a general PCS. The PCS 412 shown in FIG. 4 may be configured to be the same as the example shown in FIG. 5.

Figure 6:
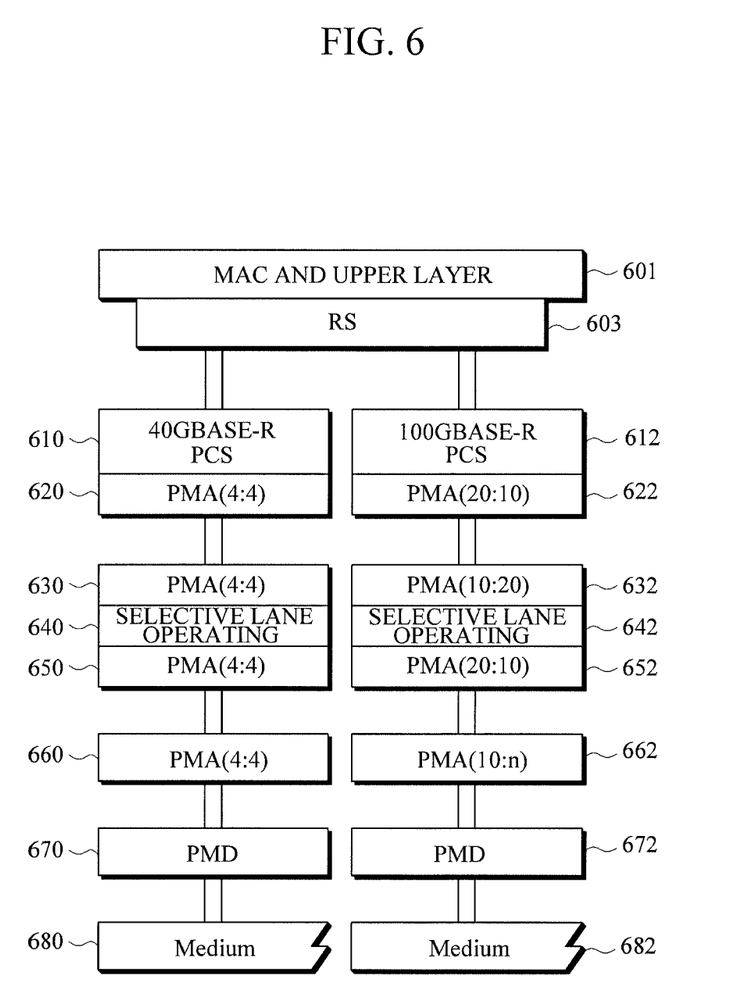
FIG. 6 is a diagram illustrating an example of a layer configuration of an Ethernet apparatus when selective lane operation is performed on a physical medium attachment (PMA) sub-layer.

FIG. 6 illustrates an example of a layer configuration of an Ethernet apparatus when selective lane operation is performed on a PMA sub-layer.

Referring to FIG. 6, the layer configuration is configured to selectively add a function of selective lane operation without modifying an IEEE802.3 standard Ethernet layer configuration. In FIG. 6, a MAC and upper layer 601 and an RS 603 may be used in common by a physical layer configuration of a 40-gigabit Ethernet and a PHY layer configuration of a 100-gigabit Ethernet.

According to the maximum transfer rate, the physical layer configuration of a 40-gigabit Ethernet may consist of a PCS 610, PMAs 620, 630, 650, and 660, a selective lane operating unit 640 interposed between the PMA 630 and the PMA 650, a PMD 670, and a transmission medium 680. The physical layer configuration of a 100-gigabit Ethernet may consist of a PCS 612, PMAs 622, 632, 652, and 662, a selectively lane operating unit 642, a PMD 672, and a transmission medium 682. In the example shown in FIG. 6, the selective lane operating unit may be configured as an example illustrated in FIG. 7.

Figure 7:
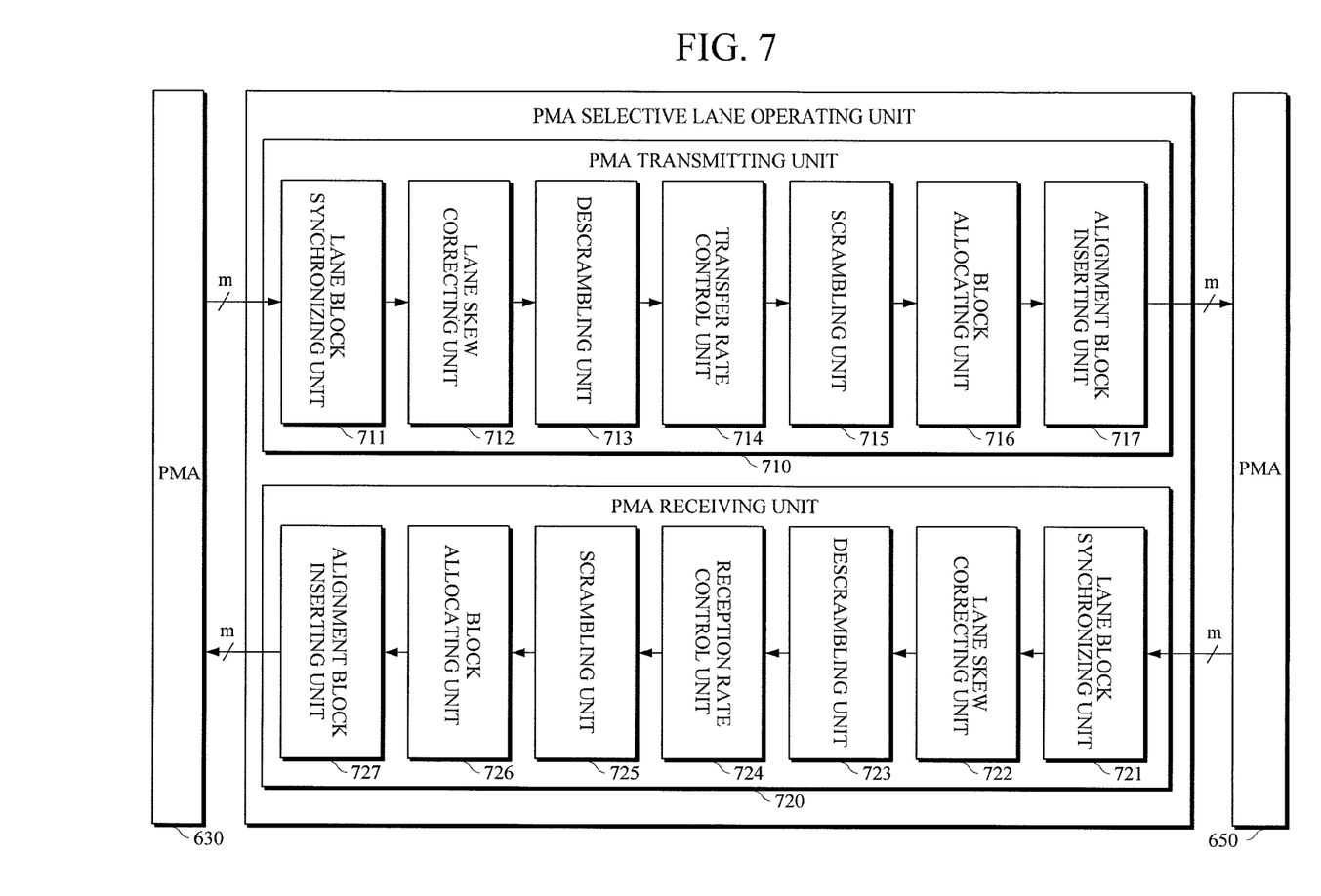
FIG. 7 is a diagram illustrating an example of a configuration of an Ethernet apparatus when selective lane operation is performed on a PMA sub-layer.

FIG. 7 illustrates an example of a configuration of an Ethernet apparatus when selective lane operation is performed on a PMA sub-layer.

A PMA selective lane operating unit 700 may support supplementary selective lane operation when an Ethernet apparatus is implemented using a common-use module including MAC/PCS sub-layer in accordance with IEEE 802.3 standards. The PMA selective lane operating unit 700 may correspond to the selective lane operating unit 640 in the example illustrated in FIG. 6, and may include a PMA transmitting unit 710 and a PMA receiving unit 720.

The PMA transmitting unit 710 may include a lane block synchronizing unit 711, a lane skew correcting unit 712, a descrambling unit 713, a transfer rate control unit 714, a block allocating unit 716, and an alignment block inserting unit 717.

The lane block synchronizing unit 711 may synchronize data blocks to each other in addition to the selective lane operation function.

The lane skew correcting unit 712 may perform skew correction on received data.

The descrambling unit 713 may descramble the received data block to determine whether the data block is a valid data block containing valid data or an idle block containing meaningless data.

In response to receiving state change information that indicates whether a physical transmission lane is activated from an upper layer, the transfer rate control unit 714 may set states of PCS lanes to be the same as the respective corresponding physical transmission lanes. Moreover, the transfer rate control unit 712 may specify a transfer rate provided by physical transmission lanes in active state to determine a transfer rate (or bandwidth) reduced from the maximum transfer rate. The transfer rate control unit 713 may selectively remove idle blocks from data blocks forwarded from an upper layer at the maximum transfer rate to adjust a current transfer rate to the reduced transfer rate provided by a transmission link. That is, the transfer rate control unit 713 may remove the idle blocks from the received data blocks by an amount of a transfer rate reduced from the maximum transfer rate due to inactive lanes.

The scrambling unit 715 may scramble the transmission data blocks adjusted according to a valid transfer rate.

The block allocating unit 716 may allocate the data blocks that have been through encoding, scrambling and descrambling to a number of PCS lanes. The PCS lanes are virtual lanes used by the PMA selective lane operating unit 700. The block allocating unit 716 may allocate the data blocks to the PCS lanes that correspond to physical transmission lanes in active state at a fair rate, excluding the PCS lanes that correspond to physical transmission lanes in inactive state. In addition, the block allocating unit 716 may not allocate the transmission data blocks to the PCS lanes in inactive state but instead may insert idle data blocks that have the same size as the transmission data blocks and have meaningless values into the PCS lanes in inactive state. This insertion is performed to prevent affecting the PMA sub-layer 650 that performs multiplexing/demultiplexing.

The alignment block inserting unit 717 may additionally insert an alignment block to each PCS lane periodically, and an output from the alignment block inserting unit 715 may be output to the PMA sub-layer.

Then, a transmission direction is determined. The PMA receiving unit 720 may include a lane block synchronizing unit 721, a lane skew correcting unit 722, a descrambling unit 723, a reception rate control unit 724, a scrambling unit 725, a block allocating unit 726, and an alignment block inserting unit 727.

The lane block synchronizing unit 721 may remove data forwarded through PCS lanes in inactive state while synchronizing the received data with data blocks. The pieces of data to be removed are data that are not forwarded through a substantial transmission link, but are idle blocks inserted by a receiving module on a lower layer.

The lane skew correcting unit 722 may perform skew correction without waiting for the PCS lanes in inactive state to receive alignment blocks.

The descrambling unit 723 may descramble received data and identify a type of data included in each block.

If a current transfer rate of a transmission link is not the maximum transfer rate because some physical transmission lanes are in inactive state, the reception rate control unit 724 may insert idle data (or idle blocks) by the same amount as the difference between the current reception rate and the maximum transfer rate. For example, if data is received at a transfer rate of 30 G in 40 G class Ethernet, the reception rate control unit 724 may insert idle blocks corresponding to 10 G. Because the idle blocks to be inserted by the reception rate 724 may do not affect the functionality of standard MAC and PCS, the idle blocks should be inserted between Ethernet frames including data. To this end, the reception rate control unit 724 may check a type field of 66-bit block, and if a relevant block indicates a tail or end of the frame or an idle block, may insert idle blocks to the end of the block as many as necessary to reach the maximum transfer rate.

An output of the reception rate control unit 724 may be matched to the maximum transfer rate, and the scrambling unit 725 may scramble the output of the reception rate control unit 724. The block allocating unit 726 may allocate the scrambled data blocks to a number of PCS lanes. However, the block allocating unit 726 is able to allocate the data block to all PCS lanes in a round-robin scheme, unlike the block allocating unit 716. The alignment block inserting unit 727 may insert an alignment block to each PCS lane.

The scrambling unit 715 and the descrambling unit 713 included in the PMA transmitting unit 710 may function the same as the scrambling unit 725 and the descrambling unit 723. The is alignment block inserting unit 717 and the alignment block inserting unit 727 may have the same function as each other. On the other hand, unlike the lane skew correcting unit 712, the lane skew correcting unit 722 may recognize a lane in inactive state, and prevent an event that no alignment block is received from the recognized lane from being processed as an error.

As described above, data may be transmitted and received at a lower transfer rate than the maximum transfer rate without loss of Ethernet frames including valid traffics. In particular, a transfer rate control method compatible to IEEE802.3 standard Ethernet is provided. As such, states of lanes are adaptively controlled according to traffic occurrence, and thus energy consumption on a transmitting module and a receiving module connected to each physical transmission lane can be reduced.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable is codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An Ethernet apparatus comprising:
   a receiver for receiving data blocks;
   a generator for generating idle data blocks and inserting idle data blocks with the received data blocks;
   a transfer rate control unit configured to determine idle data blocks from the received data blocks to determine transfer rate of physical transmission lane in active state and to set a state of each of multiple physical coding sub-layer (PCS) lanes inside to be the same as a state of corresponding each of multiple physical transmission lanes based on state change information that indicates whether the each physical transmission lane is activated or not, and to remove idle blocks from the data blocks which are received at a transfer rate of a physical transmission lane in active state among the multiple physical transmission lanes; and
   a block allocating unit configured to allocate the data blocks from which the idle blocks have been removed to PCS lanes in active state that correspond to the physical transmission lanes in active state,
   wherein the transfer rate control unit is further configured to receive the state change information from an upper layer and to check the transfer rate of the physical transmission lane in active state according to the state change information, and
   wherein the receiver is further configured to generate no error even when an alignment block has not been received from a PCS lane in inactive state corresponding to a physical transmission lane in inactive state among the multiple physical transmission lanes.

2. The Ethernet apparatus of claim 1, wherein the block allocating unit is further configured to generate other idle blocks and allocate the other idle blocks to PCS lanes in inactive state that correspond to physical transmission lanes in inactive state among the multiple physical transmission lanes.

3. The Ethernet apparatus of claim 1, wherein the transfer rate control unit is further configured to be included in a PCS of a physical layer.

4. The Ethernet apparatus of claim 1, wherein the transfer rate control unit is further configured to be included a physical medium attachment (PMA) sub-layer of a physical layer.

5. The Ethernet apparatus of claim 1, wherein the transfer rate control unit is further configured to determine a relationship between the multiple physical transmission lanes and the multiple PCS lanes in an effort to set states of the respective PCS lanes to be the same as states of the respective corresponding physical transmission lanes.

6. The Ethernet apparatus of claim 5, further comprising:
   multiple transmitting modules connected to the respective multiple physical transmission lanes,
   wherein the transfer rate control unit is further configured:
   to generate a specific data block including PCS lane identification information for identifying each of the PCS lanes through each of the PCS lanes and transmit the generated data block continuously during a determination on the relationship between the multiple physical transmission lanes and the multiple PCS lanes is being made while setting a transmitting module connected to a physical transmission lane to be inspected for sequential inspection among the multiple physical transmission lanes in inactive state and maintaining states of transmitting modules connected to the remaining physical transmission lanes in active state,
   to distinguish successfully transmitted PCS lane identification information and non-transmitted PCS lane identification information by interpreting data blocks transmitted to the transmission modules that are in active state,
   to determine that a PCS lane of the non-transmitted PCS lane identification information corresponds to the inactivated physical transmission lane, and
   to make a determination on a relationship between each of the remaining physical transmission lanes and each PCS lane in the same manner as performed above.

7. The Ethernet apparatus of claim 6, wherein the transmission module connected to the physical transmission lane which is inactivated according to the state change information is operated at low power.

8. An Ethernet apparatus comprising:
   a data transmitting unit configured to process data transmitted from an upper layer by selectively using multiple physical coding sub-layer (PCS) lanes inside so as to use some of multiple physical transmission lanes; and
   a data receiving unit configured to process data transmitted through the some physical transmission lanes,
   wherein the data transmitting unit is configured to comprise:
   a transfer rate control unit configured to determine a state of each of multiple physical transmission lines, determining transfer rate of physical transmission lane in active state, to set a state of each of the multiple PCS lanes inside the Ethernet apparatus to a state of corresponding each of the multiple physical transmission lanes based state change information that indicates the each physical transmission lane is activated or not, and to remove idle blocks from data blocks which are received at a transfer rate of a physical transmission lane in active state among the multiple physical transmission lanes; and a block allocating unit configured to transmit the data blocks from which the idle blocks have been removed through PCS lanes in active state, wherein the data receiving unit is further configured to generate no error even when an alignment block has not been received from a PCS lane in inactive state corresponding to a physical transmission lane in inactive state among the multiple physical transmission lanes.

9. The Ethernet apparatus of claim 8, wherein the data receiving unit is further configured to further comprise a reception rate control unit included in a physical medium attachment (PMA) sub-layer and when a current transfer rate of a transmission link of a current physical transmission lane is different from a maximum transfer rate, the reception rate control unit is configured to insert a number of idle blocks corresponding to a difference between the current transfer rate and the maximum transfer rate so as to make the current transfer rate of the transmission link the same as the maximum transfer rate, and to perform data transmission to the upper layer at the maximum transfer rate.

10. The Ethernet apparatus of claim 8, further comprising:
a plurality of receiving modules connected to the respective multiple physical transmission lanes,
wherein some receiving modules connected to physical transmission lanes in inactive state according to the state change information are operated at low power.

11. A method of selectively operating multiple lanes of an Ethernet apparatus, comprising:
determining a state of each of multiple physical transmission lanes;
setting a state of each of multiple physical coding sub-layer (PCS) lanes inside the Ethernet apparatus to be the same as a state of corresponding each of multiple physical transmission lanes based on state change information that indicates whether the each physical transmission lane is activated or not;
receiving data blocks;
determining idle data blocks from the received data blocks;
determining transfer rate of physical transmission lane in active state;
removing idle blocks from the data blocks which are received at the transfer rate of the physical transmission lane in active state among the multiple physical transmission lanes;
transmitting the data blocks from which the idle blocks have been removed through PCS lanes in active state that correspond to the physical transmission lanes in active state;
receiving data through the physical transmission lanes in active state among the multiple physical transmission lanes; and
generating no error even when an alignment block has not been received from the PCS lane in inactive state corresponding to the physical transmission lane which is set to inactive state according to the state change information among the multiple physical transmission lanes, and processing the received data.

12. The method of claim 11, further comprising:
allocating other idle blocks to the PCS lane in inactive state corresponding to the physical transmission lane in inactive state among the multiple physical transmission lane.

13. The method of claim 11, further comprising:
determining a relationship between each of the multiple physical transmission lanes and each of the multiple PCS lanes so as to set a state of each of the PCS lanes to be the same as a state of corresponding each of the multiple physical transmission lanes.

14. The method of claim 13, wherein the determining of the relationship between the each of the multiple physical transmission lanes and the each of the PCS lanes comprises
generating a particular data block including PCS lane identification information and continuously transmitting the generate data block through each of the PCS lanes,
maintaining a transmitting module connected to a physical transmission lane to be inspected for sequential inspection among the multiple physical transmission lanes in inactive state and maintaining states of transmitting modules connected to the remaining physical transmission lanes in active state,
distinguishing successfully transmitted PCS lane identification information and non-transmitted PCS lane identification information by interpreting data blocks transmitted to the transmission modules that are in active state,
determining that a PCS lane of the non-transmitted PCS lane identification information corresponds to the inactivated physical transmission lane and
repeating operations of the maintaining of the states of the transmitting modules, the distinguishing of the PCS lane identification information, and the determining of the PCS lane of the non-transmitting PCS lane identification information as corresponding to the inactivated physical transmission lane until the determination on a relationship of the remaining physical transmission lanes with each of the PCS lanes is all made.

15. The method of claim 11, further comprising:
operating any of a plurality of transmitting modules connected to the respective multiple physical transmission lanes at low power when the any of the transmitting modules are connected to the physical transmission lanes which are set to inactive state according to the state change information among the multiple physical transmission lanes.

16. The method of claim 11, further comprising:
operating any of a plurality of receiving modules connected to the respective multiple physical transmission lanes at low power when the any of the receiving modules are connected to the physical transmission lanes that are set to inactive state according to the state change information.

17. The method of claim 11, when the method is performed in a physical medium attachment (PMA) sub-layer of the Ethernet apparatus, further comprising:
when a maximum transfer rate of the multiple physical transmission lanes is different from a current transfer rate at which data is currently input, inserting idle data into the data to compensate for the difference so as to avoid an influence on upper layer processing and allocating data to the multiple PCS lanes at the maximum transfer rate.

* * * * *